March 2, 1954     B. W. SEWELL ET AL     2,670,926
SEISMOGRAPH CABLE HANDLING DEVICE Filed Aug. 9, 1951     3 Sheets-Sheet 1

Ben W. Sewell
John M. Camp    Inventors

By W. O. Kilman   Attorney

Ben W. Sewell
John M. Camp   Inventors

By W. O. Hillman  Attorney

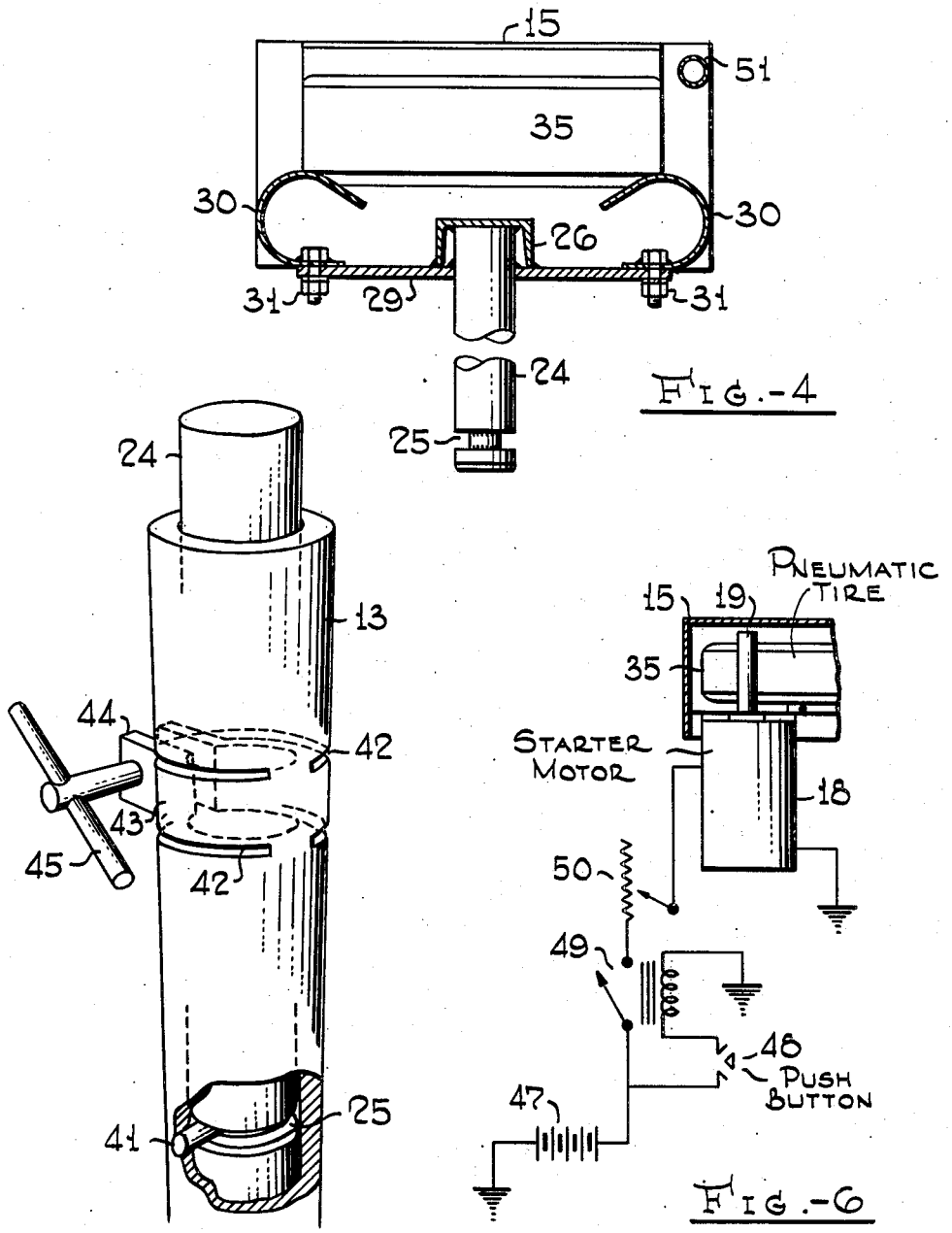

Patented Mar. 2, 1954

2,670,926

UNITED STATES PATENT OFFICE 2,670,926

SEISMOGRAPH CABLE HANDLING DEVICE

Ben W. Sewell and John M. Camp, Tulsa, Okla., assignors to Standard Oil Development Company, a corporation of Delaware Application August 9, 1951, Serial No. 241,044

6 Claims. (Cl. 254—175.5)

This invention relates to an apparatus that may be mounted on a truck or other vehicle and employed to pick up seismograph cable, hose or the like and deposit it in a random pile in the truck or to pay out the cable from the truck and lay it on the ground.

In seismic prospecting the depth and probable nature of geological strata beneath the earth's surface are ascertained by initiating a seismic shock at a selected point at or near the earth's surface, the resulting motion of the earth from seismic waves initiated by the seismic disturbance being detected at a number of points on the earth's surface by means of sensitive pickups, known as geophones or seismometers, which translate the detected wave motion into electrical impulses which after suitable amplification can be recorded on a seismograph. From the arrival times of the various reflected waves determined from the seismograph as well as from related data obtained in the area being studied, such as seismic wave velocities in the various earth layers, it is then possible to estimate the depths of the various reflecting substrata. Usually the seismic disturbance is produced by detonation of an explosive shot placed on the ground, in a shot hole, or above the surface of the ground and adjacent thereto. It is common practice to place the geophones in line with the shot point and to space them more or less evenly from each other and from the shot point. A suitable multi-conductor cable is provided through which the individual geophones can be connected to a recording station, usually a field truck, provided with seismograph instruments.

When running a seismic survey it is of course necessary to pick up the seismograph cable and move it each time the locations of shot hole and geophone spread are changed. In this connection many difficulties have been experienced with the present day mechanical cable reels on which the seismograph cable is wound for the purpose of transporting it to a desired location. One of the major objectionable features is that such equipment is very heavy and is expensive to manufacture and install on the truck. Another objection is that since the spooling of the cable on the reel must be done manually, constant attention of the operator is required. Furthermore, if the cable should become snagged the inertia of the reel will cause damage to the cable. The cable also tends to become damaged because of the stresses set up in winding the cable on the relatively small diameter of the barrel of the reel. The present invention is concerned with an improved cable handling device that overcomes these difficulties.

One object of this invention is to provide a cable handling mechanism that will reel in and pay out the cable with a minimum of damage to the cable and at the same time minimize or eliminate manual handling of the cable. Another object is to provide a cable handling device that is simple and relatively inexpensive to construct and yet is eminently well suited for the purpose.

Briefly the invention involves a mechanism comprising a framework that is mountable on a truck body, a pair of wheels rotatably supported by the frame so that the wheels lie in the same plane, a band of resilient material on the rim of each wheel, and means for rotating one of the wheels. The wheels are so spaced that the two bands of resilient material engage each other under compression. Preferably, the resilient bands have more resilience at their centers than at the edges so that when the cable is inserted between them it will tend to stay centered and not work out from between the wheels. Pneumatic tires, for example those designed for small diameter wheels such as are used on power lawn mowers, wheelbarrows and the like, are ideally suited for the purpose. By inserting the cable between the tires and rotating the wheels in the proper direction the cable can be drawn through the apparatus and deposited in the bed of the truck in a random pile. The same apparatus can be used to pick the cable up from the random pile in the truck and pay it out onto the ground. Extensive tests have proved conclusively that seismograph cable handled in this manner will not become tangled if it is allowed to fall freely into a random pile. Wear and tear on the cable are minimized because the small diameter flexing that occurs with the usual practice of winding the cable on a reel is eliminated. Because of the greater resilience of the tires at the center of their treads than at the edges of the treads, objects of larger diameter than the cable such as take-out plugs and loops pass through the device without damage. Also this greater resilience keeps the cable centered between the tires.

The nature and objects of the invention will be more clearly understood from the ensuing description when read in conjunction with the drawings in which Fig. 1 is a schematic diagram showing the method of mounting the device of this invention on the rear of a truck to provide for reeling in or paying out the cable;

Figure 4 is a sectional side view taken on line IV—IV of Figure 3;

Figure 5 is a perspective view, partly sectioned, showing mounting and fastening details of the apparatus; and Figure 6 is a schematic diagram of control circuit arrangement for practicing the invention.

Figure 1:
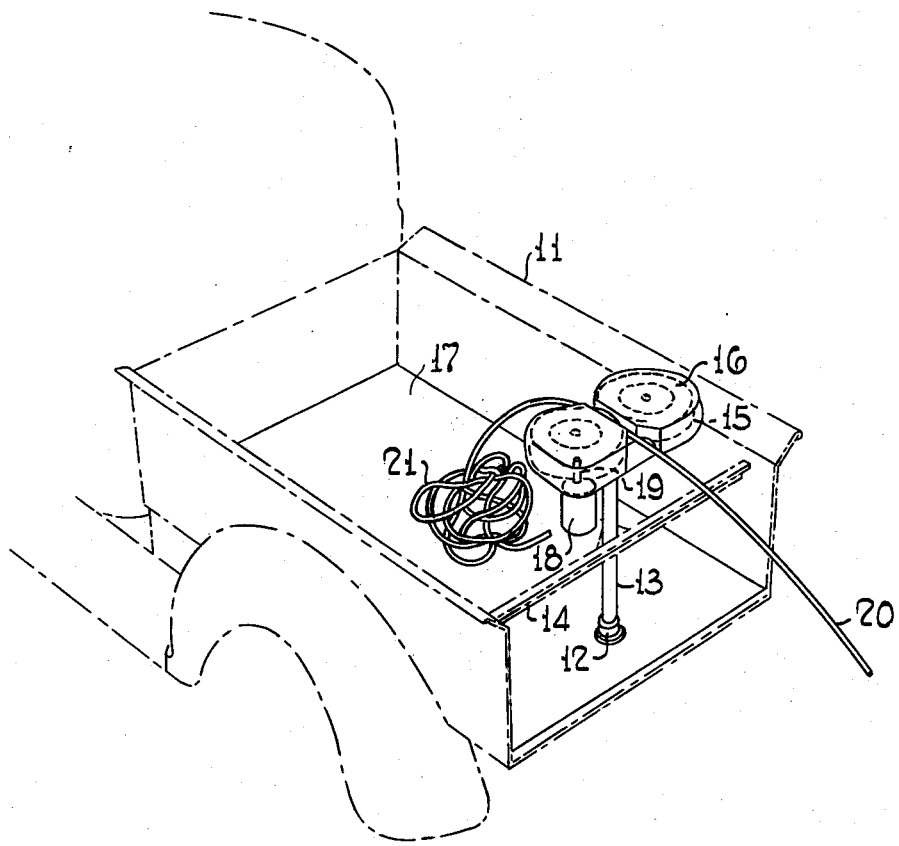

Referring specifically to Figure 1, one form of apparatus embodying the invention is shown mounted on the back of a truck 11. A socket 12 is provided on the truck floor 17 to receive a mounting tube 13 which is held in place and braced by a crossbar 14. Mounting tube 13 supports a frame holding wheels 16 protected by a case or cover 15 as is more clearly shown in Figures 2, 3 and 4. One of the wheels 16 is driven by a motor 18 whose drive shaft 19 makes frictional engagement with the outer portion of the wheel. Since the two wheels 16 are in resilient engagement it will be seen that as they are rotated in the proper direction cable 20 will be pulled between them and placed in a random pile 21 on the truck floor 17. The truck floor or bed therefore serves as a base support on which cable can be piled, free of the pneumatic tires. As will be shown the mechanism may be turned through 180° on the support so that the wheels may pay out cable from the truck without changing the direction of rotation of the wheels or the motor.

Figure 3:
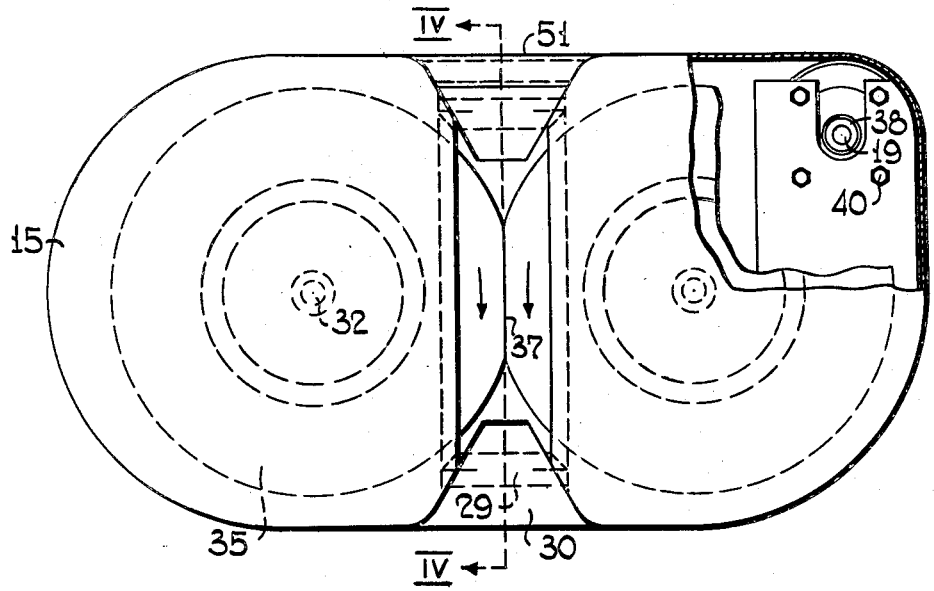
Figure 3 is a top view, partly in section, of the embodiment of Figure 2.
Figure 2:
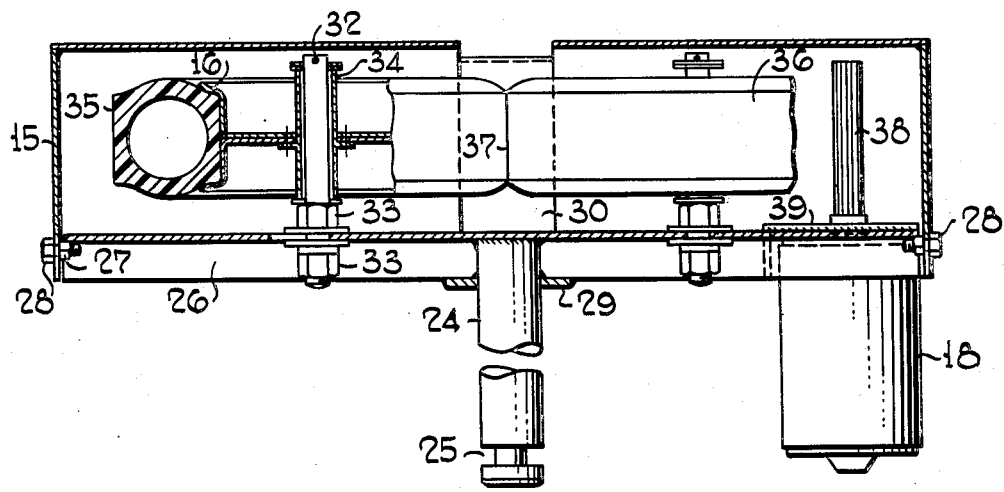
Figure 2 is a side elevational view, partly in section, of the major portion of a specific embodiment of the invention.

Figures 2, 3 and 4 are elevational, top, and side sectional views respectively of one embodiment of the invention. A supporting frame 26 which may conveniently be a piece of channel iron has welded to it in perpendicular relation a cylindrical rod 24 of such size that it will fit slidably and rotatably into mounting tube 13. The purpose of groove 25 adjacent the bottom of rod 24 is explained later in connection with Figure 5. Welded to the ends of frame 26 are nuts 27 which receive bolts 28 so that protective case 15 may be detachably mounted to the frame. A flat cross piece 29 is welded to rod 24 and to frame 26 and at right angles to the latter to provide a support to which the lip portions 30 of the case may be conveniently attached by nut and bolt assemblies 31. The lip portions 30 provide convenient guide means for the cable as shown in Figure 1.

Threaded axle shafts 32 are vertically supported by frame 26 and are attached thereto with hex nuts 33. The axle shafts receive bearings 34 which rotatably support rimmed wheels 16 on which are mounted pneumatic tires 35. The spatial relation of the wheels is such that the tires are in frictional engagement in the center of the case along line 37.

Also welded to frame 26 is a plate 39 to which motor 18 is attached by bolts 40 so that the drive shaft 19 will frictionally engage one of the tires 35. Preferably shaft 19 has a resilient sleeve 38 fitted over it for more efficient frictional engagement with the tire. Conveniently this sleeve may comprise a piece of garden hose, for example. A friction drive of this type is preferred over a direct drive for reasons of safety. This is so because such a drive is characterized by the fact that it provides slippage between the wheel and the motor or other power source when the load applied to the wheel exceeds a predetermined value.

As shown in Figure 5, rod 24 fits slidably and rotatably within mounting tube 13 and is held against vertical movement by removable pin 41 which engages slot 25 and thereby prevents rod 24 from jumping out of tube 13 when the apparatus is in use. Slots 42 are cut into tube 13 to form clamp portions 43 to which are attached lugs 44 that receive a clamp screw 45 so that rod 24 may be clamped against rotational movement when desired. Thus it is possible to employ a simple motor 18 having a constant direction of rotation and yet use the apparatus for reeling in cable or for paying out cable merely by rotating the entire assembly on supporting tube 13 and clamping it in the proper position. The device may also be clamped at any selected angle when it is desired to pay out cable to one side of the road as the truck moves along the road.

A rod 51 may be fastened to the case to provide additional guide means on the intake side of the device, the cable passing between the rod and the lip portion 30.

Conveniently motor 18 may comprise simply an automobile starter motor whose speed may be controlled by a rheostat. A suitable circuit for starting and stopping the motor and for controlling its speed is shown schematically in Figure 6 and consists essentially of a battery or other power source 47, a push button or equivalent switching means 48, a relay 49 and a rheostat 50. Release of the push button will stop the motor immediately, this feature offering advantages in safety over a mechanically thrown switch.

It is not intended that this invention be limited to the specific embodiments thereof described herein as modifications thereof are contemplated. The invention is to be limited only by the following claims.

What is claimed is:

1. A device adapted to reel in cable and to pay out cable comprising in combination: a supporting frame, a pair of pneumatic tires rotatably supported by said frame, said tires lying in essentially the same plane with the treads engaging each other under compression, a source of power for driving said tires, drive means to transfer said power to at least one of said tires, said drive means being adapted to provide slippage when the load applied to said tires exceeds a predetermined value, and a laterally extensive base member to which said supporting frame is fixed, said base member lying substantially below the said tires whereby cable passing through the tires may collect in a random pile on the base member clear of the tires.

2. The device defined by claim 1 in which said supporting frame includes means to permit rotation of said paired tires 180° in the plane in which they lie, whereby said device can be rotated as stated to reel in or pay out cable.

3. Device according to claim 1 in which said power source is a prime mover having a driving axle comprising said drive means, said driving axle resiliently engaging the tread of one of said tires.

4. Device according to claim 1 including a cylindrical rod attached to said frame, said rod having an annular groove, a supporting tube slidably receiving said rod, a removable pin supported by said tube and engageable with said groove, and clamping means on said tube engageable with said rod whereby said tube may be mounted on a vehicle and said frame clamped in a selected position to reel in or pay out cable from said vehicle.

5. Device according to claim 1 including guide means for said cable supported by said frame adjacent at least one end of the line of contact of said tires.

6. A device adapted to reel in cable and to pay out cable comprising in combination: a supporting frame, a pair of pneumatic tires rotatably supported by said frame, said tires lying in essentially the same plane with the treads engaging each other under compression, power drive means for driving said tires, said drive means being adapted to limit the driving force applied to the tires to a predetermined value whereby breakage of the cable reeled between the tires is prevented in the event the cable becomes snagged during operation, and a laterally extensive base member to which said supporting frame is fixed, said base member lying substantially below the said tires whereby cable passing through the tires may collect in a random pile on the base member clear of the tires.

BEN W. SEWELL.
JOHN M. CAMP.

References Cited in the file of this patent

UNITED STATES PATENTS

| Number | Name | Date |
| --- | --- | --- |
| 207,514 | Guex | Aug. 27, 1878 |
| 1,417,021 | Bevel | May 23, 1922 |
| 1,768,809 | Van Orstrand | July 1, 1930 |
| 2,074,524 | Uber | Mar. 23, 1937 |
| 2,272,158 | Anderson | Feb. 3, 1942 |

FOREIGN PATENTS

| Number | Country | Date |
| --- | --- | --- |
| 513,887 | Great Britain | Oct. 24, 1939 |